J. SCHULER.
RAIL JOINT.
APPLICATION FILED JULY 29, 1913.
1,097,109.
Patented May 19, 1914.
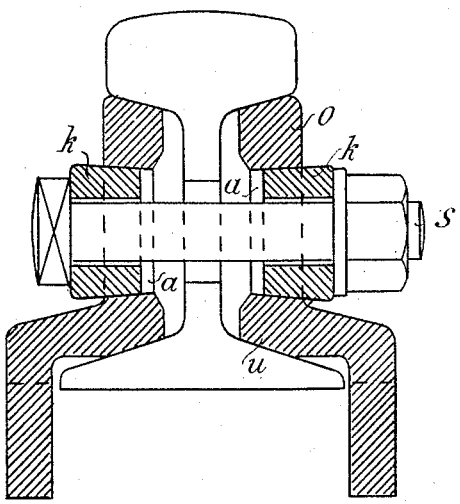
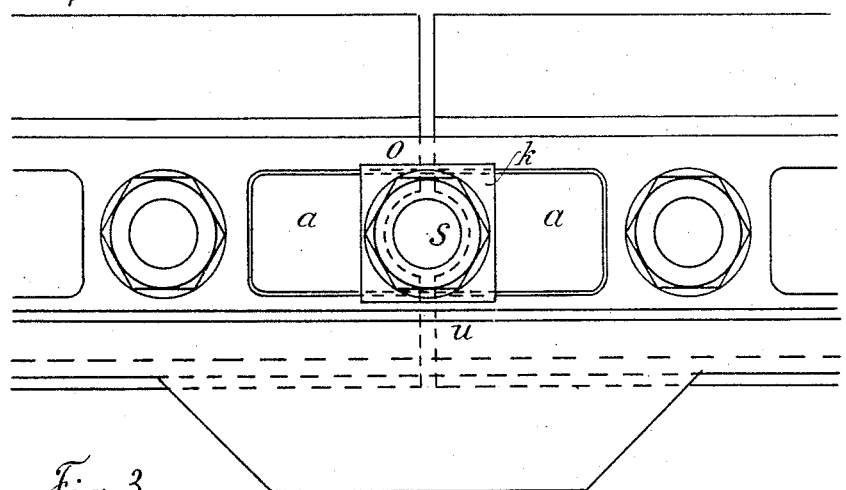
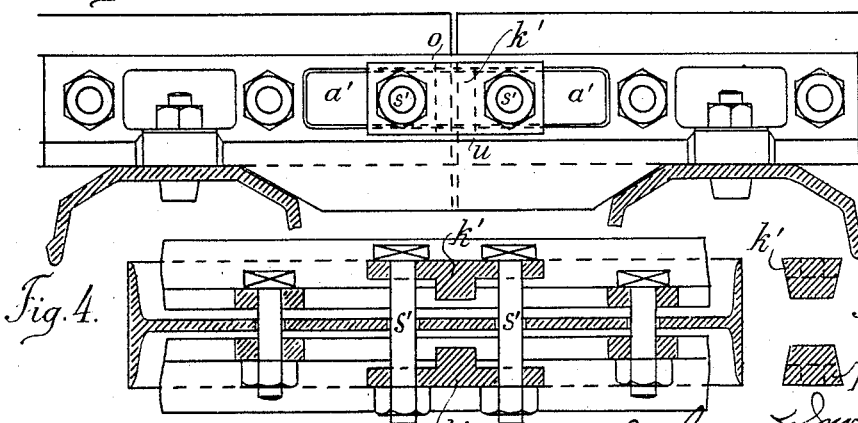
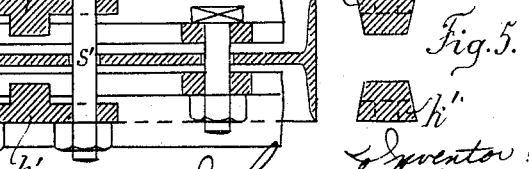

UNITED STATES PATENT OFFICE.

JOHANN SCHULER, OF DUSSELDORF, GERMANY.

RAIL-JOINT.

1,097,109.  Specification of Letters Patent.  Patented May 19, 1914.

Application filed July 29, 1913. Serial No. 781,787.

*To all whom it may concern:*

Be it known that I, JOHANN SCHULER, a subject of the German Emperor, and resident of Dusseldorf, in the German Empire, have invented a new and useful Improvement in Rail-Joints, of which the following is a specification.

In the known rail joints (butt-joints with fish plates) the contacting surfaces of the fish plates and the rails become prematurely worn out, particularly opposite the gap of the joint, and the play thus produced between the parts in question cannot be removed by screwing the fish bolts farther home. This wear and tear is caused by the constant vibrations and shocks occurring during the operation of the line, these influences causing in their turn a rubbing movement of said contacting surfaces; the obnoxious result of this movement will be obviated best by preventing the movement itself, and a variety of contrivances have already been proposed for this purpose. For instance wedges and wedge clamps have been arranged within the fish plates below the foot of the rail, or the latter has been clamped in a similar, but somewhat modified manner, or clamping pieces have been inserted between the head and the foot of the rail, in connection with fish plates the legs of which were appropriately recessed below said head; and so on. At any rate, an actual success has not been attained either by the before mentioned means, or by the application of a centrally arranged fish bolt passed through the gap between the rails.

Now, the drawbacks stated have been fully overcome by my novel connection which does not permit of any mutual rubbing action between the fish plates and the rails. This novel connection is illustrated in the accompanying drawing in which similar letters denote similar parts throughout the several views and in which—

Figure 1 is a vertical cross section through the parts constituting the joint. Fig. 2 is a side view of the same, Fig. 3 is a similar view drawn on a reduced scale and showing a slightly modified form of construction. Fig. 4 is a plan of the parts shown in Fig. 4, some parts being shown in horizontal section, and Fig. 5 shows two vertical cross sections through the parts $k'$ of Figs. 3 and 4.

Referring to Figs. 1 and 2, the fish plate webs are provided, opposite the gap of the joint, with longitudinal recesses $a$, the dimensions of which are such that the parts $o$ and $u$ above and below each recess may be pressed in between the head and the foot of the rail and thus put under an elastic tension. This is effected by means of the wedge-shaped pieces $k$ which are inserted into the recesses $a$ just opposite to the gap of the joint and are connected with each other by a bolt $s$ extending at said gap through appropriate recesses provided in the webs of the two rails. The elastic tension of the fish plate parts $o$ and $u$, or the pressure with which they are forced against the head and the foot of the rail, may be changed or regulated by means of the nut on said bolt.

Referring to Figs. 3–5, the one bolt $s$ of Figs. 1 and 2 is replaced by two bolts $s'$ extending from one wedge $k'$ to the other through the usual bolt-holes provided in the rail webs laterally from the gap of the joint, the wedges $k'$ having correspondingly situated lateral projections to hold the bolts $s'$. Also the other fish plates of the track, besides those of the joints, can be provided with recesses and wedge pieces, for the purpose of effecting a correspondingly more intimate contact between those fish plates and the respective parts of the rail.

Having now described my invention, what I desire to secure by Letters Patent of the United States is:

1. In a rail joint, the combination, with the rail ends, fish plates contacting with the head and the foot of said rail ends, and having a recess in each fish plate, a wedge situated in said recess, and a bolt connecting the two wedges with each other.

2. In a rail joint, the combination, with the rail ends, fish plates contacting with the head and the foot of the rail, and having a longitudinal recess in each fish plate, a wedge situated in the middle part of said recess, and a bolt connecting the two wedges with each other.

3. In a rail joint, the combination, with the rail ends, fish plates contacting with the head and the foot of said rail ends, and having a recess provided in each fish plate and adapted to turn this latter into a closed frame, a wedge situated in said recess and adapted to be forced farther into the same in the direction to the rail webs, a bolt connecting the two wedges with each other, and a bolt-nut adapted to force the wedges toward one another.

4. In a rail joint, the combination, with the rail ends, fish plates contacting with the head and the foot of the rail, and having a longitudinal recess provided in each fish plate and adapted to turn the middle part of the latter into a closed frame, a wedge situated in said recess and adapted to be forced farther into the same in the direction to the rail webs, a bolt connecting the two wedges with each other, and a bolt-nut adapted to force the wedges toward one another.

5. In a rail joint, the combination, with the rail ends, fish plates contacting with the head and the foot of said rail ends, and having a recess in each fish plate, a wedge situated in said recess, co-axial holes in the two wedges, and a bolt or bolts located in said holes and connecting said wedges with each other.

6. In a rail joint, the combination, with the rail ends, fish plates contacting with the head and the foot of said rail ends, and having a recess in each fish plate, a wedge situated in said recess, co-axial holes in the two wedges, recesses provided in the webs of the rail ends at the joint, and a bolt passing through these recesses and connecting the two wedges with each other.

7. In a rail joint, the combination, with the rail ends, fish plates contacting with the head and the foot of the rail, and having a longitudinal recess in each fish plate, a wedge situated in the middle part of said recess, semi-circular recesses provided in the webs of the rail ends at the joint, and a bolt passing through these recesses and connecting the two wedges with each other.

8. In a rail joint, the combination, with the rail ends, fish plates contacting with the head and the foot of said rail ends, and having a recess provided in each fish plate and adapted to turn this latter into a closed frame, a wedge situated in said recess and adapted to be forced farther into the same in the direction to the rail webs, and means for thus moving the two wedges so as to make them force the horizontal parts of said frames against the abutting parts of the rail head and foot, substantially as described.

In testimony whereof I affix my signature in presence of two witnesses.

JOHANN SCHULER. [L. S.]

Witnesses:
 HELEN NUFER,
 ALBERT NUFER.